United States Patent [11] 3,557,835

| [72] | Inventors | Joachim Heiser Bernhausen; Hans Helfensdorfer, Stuttgart-Fasanenhof; Diether Slowak, Ludwigsburg; Klaus Sopha, Stuttgart, Germany |
|---|---|---|
| [21] | Appl. No. | 731,404 |
| [22] | Filed | May 23, 1968 |
| [45] | Patented | Jan. 26, 1971 |
| [73] | Assignee | Robert Bosch G.m.b.H. Stuttgart, Germany |
| [32] | Priority | June 1, 1967 |
| [33] | | Germany |
| [31] | | B9281911/47g |

[54] COMPOSITE VALVE MEMBER
12 Claims, 3 Drawing Figs.
[52] U.S. Cl. .................................................. 137/625.48
[51] Int. Cl. ...................................................... F16k 11/07
[50] Field of Search ......................................... 137/625.48, 625.68

[56] References Cited
UNITED STATES PATENTS
246,634  9/1881  Plimpton ..................... 137/625.48

*Primary Examiner*—M. Cary Nelson
*Assistant Examiner*—Michael O. Sturm
*Attorney*—Michael S. Striker ABSTRACT: A valve body for use in hydraulic slide valves consists of a female member and a male member. The female member is constructed as a sleeve and the male member includes an elongated first portion extending through the sleeve and defining with the inner circumferential wall surface thereof at least one longitudinally extending open-ended passage, and two additional portions respectively rigid with the ends of the first portion located adjacent to but slightly spaced from the opposite axial ends of the sleeve and defining with the latter to substantially radial gaps communicating with opposite ends of the longitudinal passage.

PATENTED JAN 26 1971　　　　　　　　　　　3,557,835

INVENTORS
Joachim HEISER
　Hans HELFENSDÖRFER
Diether SLOWAK
Klaus SOPHA 3,557,835

COMPOSITE VALVE MEMBER

BACKGROUND OF THE INVENTION

The present invention relates generally to articles of manufacture, and more particularly to a valve body. Still more particularly the invention relates to a valve body for use in hydraulic slide valves.

In hydraulic slide valves, where the valve body is constructed as a body of rotation, it is known to assembly the valve body from individual components which are soldered together. However, the constructions of this type which heretofore have become known suffer from various disadvantages, particularly the fact that they oppose significant resistance to the flow of a pressure fluid through a valve provided for such a valve body, and also because they are rather difficult to manufacture and to assemble in view of the several components which are required and in view of the various manufacturing steps needed for assemblies these components into a valve body and for subjecting the valve body to finishing treatments.

It is therefore a general object of the present invention to provide an article of the type here in question which is not subject to the aforementioned disadvantages.

A more particular object of the invention is to provide such an article, particularly a valve body which is especially suited for use in hydraulic slide valves, which will provide very little or no assistance to the flow of pressure fluid.

A further object of the invention is to provide such an article which is very simple to manufacture and to assemble and consists of relatively few components which can be quickly and easily manufactured and assembled.

SUMMARY OF THE INVENTION

In accordance with one feature of our invention we provide a valve body which is particularly suited for use in hydraulic slide valves and which comprises at least one sleeve-shaped female member having an inner circumferential wall surface, and a male member which extends through the female member and which includes at least one first portion located within the female member rigid with the wall surface and defining with the latter at least one longitudinally extending passage. The male member further comprises at least a pair of second portions each of which is rigid with one end of the first portion and located outwardly adjacent to but slightly spaced from the respective axial end of the sleeve-shaped female member so as to define with the same a substantially radial gap which communicates with the open ended passage.

By resorting to our novel construction we obtain cross-sectional areas for the pressure-fluid passages which are significantly larger than what is known from the art and which in a given position of the valve body permit an increase in the pressure fluid throughput which may be on the order of 100 percent. Furthermore, our construction provides for an improved flow path.

By the use of our construction it is also possible to eliminate the formation of burrs which heretofore always required a separate processing step in order to remove these objectionable projections.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
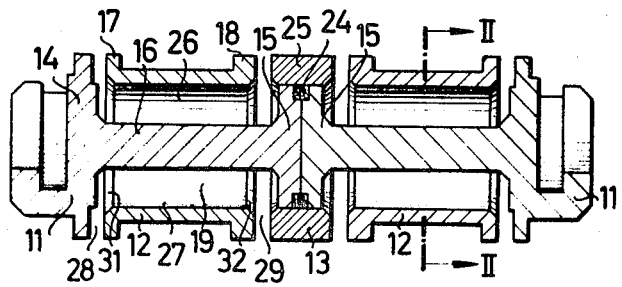
FIG. 1 is an axial sectional elevation illustrating one embodiment of our invention.
Figure 2:
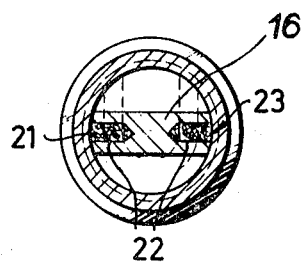
FIG. 2 is a section taken on the line II-II of FIG. 1.

Discussing firstly the embodiment illustrated in FIGS. 1 and 2 it will be seen that the valve body shown there is of symmetrical construction and consists of two identical male members 11 and two identical female sleeve-shaped members 12. An annular member 13 connects the male members 11 together. Each of the male members 11 consists of a first portion 16 which is rigid at its opposite axial ends of the respective second portions 14, 15. The second portions are of substantially cylindrical cross-sectional configuration, as is who shown in FIG. 2, and the cross-sectional configuration of the first portion 16 is also visible in FIG. 2. It will be noted that the outer diameter of the portion 15 in the illustrated embodiment corresponds to the maximum outer diameter of the portion 16 so that the sleeve 12 associated with the respective male portion 11 can be slid over the portion 15 and onto the portion 16. FIG. 2 shows that the outwardly directed side faces 23 of the portion 16 abut against the inner circumferential wall surface 19 of the sleeve 12. If desired, this abutment can be made a friction fit so that the sleeve 12 is rigid with the portion 16 simply by being slid onto the same. In the illustration embodiment, however, the side surfaces 23 are provided with recesses, such as bores or other depressions, which are identified with reference numeral 22 and which each contain a quantity 21 of what in this embodiment is assumed to be copper solder. It is clearly visible in FIGS. 1 and 2 that the portion 16 defines with its associated sleeve 12 two longitudinally extending flow passages 26, 27 although of course a single such flow passage or more than two such flow passages could also be provided.

The respective second portions 14, 15 are slightly axially spaced from the ends 17, 18 of the respective sleeve 12 so as to define therewith respective substantially radially extending gaps 28, 29 which each communicate with one open end of the passages 26, 27. The ends 17, 18 of the respective sleeves 12 are provided with chamfers 31, 32 for the purpose of avoiding, when the assembled body is subsequently subjected to additional material-removing steps, the occurence of burrs, thus saving the burr-removing step heretofore necessary.

The two portions 15 of the respective male members 11 abut against one another, as seen in FIG. 1, and are surrounded by an annular member 13. In the illustrated embodiment both the portions 15 are provided with suitable recesses filled with quantities of copper solder 24 which adheres to the inner circumferential face 25 of the annular member 13.

Figure 3:
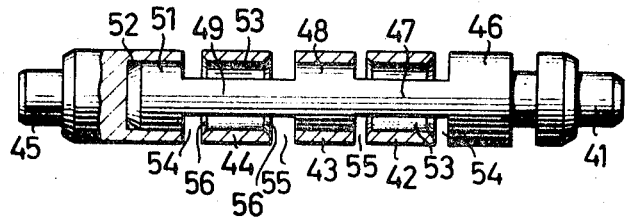
FIG. 3 is a view similar to FIG. 1, but only partly sectioned, and illustrating a further embodiment of the invention.

The embodiment illustrated in FIG. 3 is particularly suitable for constructing valve bodies of small configuration and intended for regulating the flow of small quantities of pressure fluids. In this embodiment the male member is identified with reference numeral 41, and there are provided three sleeve-shaped female members which are respectively identified with reference numerals 42, 43 and 44.

As FIG. 3 shows, the male member 41 is provided with a substantially cylindrical portion 46 and two additional substantially cylindrical portions 48 and 51, the latter both having an outer diameter which is smaller than that of portion 46. Interposed between the portions 46 and 48 is a reduced diameter portion 47, and interposed between the portions 48 and 51 is a similarly reduced diameter portion 49. The male member 41 is, as the illustration in FIG. 3 shows, of one-piece construction.

The two female members 42 and 44 respectively surround the portions 47 and 49 in the same manner in which this has been illustrated in FIG. 1. Thus, the portions 47 and 49 each define with their respective associated female members 42 and 44 two longitudinally extending flow passages 53. The third female member 43 so surrounds the substantially cylindrical portion 48 of the male member 41 but does not define any flow passages therewith. Between the portion 46 and the female member 42 there is a radial gap 54 communicating with the flow passages 53, and a similar radial gap, identified with reference numeral 55, is provided between the portion 48 and the female member 42 and communicates with the opposite ends of the flow passages 53. Similar radial gaps 54 and 55 exist between the female member 44 and the portions 51 and 48, respectively. The female members 42 and 44 are also each provided with a chamfer 56 at their respective opposite axial ends for the purposes described with respect to the embodiment of FIGS. 1 and 2. The portion 51 of the male member 41 is received in a recess of an end member 45 wherein it is suitably secured, for instance by copper solder 52. It will be noted that the outer diameter of the member 45 is identical with the outer diameters of the female members 42, 43 and 44 and of the portion 46 of the male member 41.

In the embodiment of FIG. 3 a thin foil of copper solder is introduced into each of the passaged 53 which, during the soldering operation and when in liquid state, enters into the minute spaces between the female members 42, 44 and the portions 47, 49 as well as between the female member 43 and the portion 44 by capillary action. While it is possible that some of the solder may remain on the surfaces bounding the respective passages 53, and form thereon a thin coating, this is acceptable because it will not significantly reduce the cross-sectional diameter of the passages.

Both in the embodiment of FIG. 1 and in that of FIG. 3 the valve body, once assembled, is hard soldered, hardened and precision ground.

As already pointed out, soldering is but one way of connecting the various components to one another. Connection particularly of the respective female members with the associated portions of the male members can also be effected by friction fitting because there are relatively large abutting surfaces available. If this type of assembly is chosen, the completed valve body may again be hardened and precision ground and valve bodies according to the present invention whose components are connected in this manner are particularly suited for controlling small streams of pressure fluids at low pressures.

It will be understood that each of the elements described above, or two or more together, may also find a useful application in other types of constructions differing from the types described above.

While the invention has been illustrated and described as embodied in a valve body particularly suitable for hydraulic slide valves, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meanings and range of equivalence of the following claims.

What is claimed is new and desired to be protected by Letters Patent is set forth in the appended.

We claim:

1. As a novel article of manufacture, a valve body particularly for use in hydraulic slide valves, comprising in combination, least one sleeve-shaped female member having an inner circumferential wall surface; a male member extending through said female member and including at least one first portion located within said female member rigid with said wall surface and having outwardly directed surface portions abutting against the same, said first portion having in one radial plane of said female member a first cross-sectional dimension at least substantially equal to the inner diameter of said female member and in another radial plane normal to said one plane a second cross-sectional dimension substantially smaller than said inner diameter so as to define with said wall surface at least one longitudinally extending open ended passage, and at least a paid pair of second portions each rigid with one end of said first portion and located outwardly adjacent to but slightly spaced from the respective axial end of said sleeve-shaped female member and defining with the same a substantially radial gap communicating with said passage; and recesses in said surface portions for accommodating quantities of solder.

2. An article of manufacture as defined in claim 1; said second portions being of substantially cylindrical cross section and one of them having a smaller outer diameter than the other; and further comprising an additional male member similar to the first-mentioned male member and axially aligned therewith so that the respective second portions of smaller outer diameter abut against one another; securing means rigidly securing the abutting second portions of smaller diameter to each other; and an additional sleeve-shaped female member surrounding the first portion of said additional male member rigid therewith and defining with said first portion of said additional male member an addition longitudinally extending passage and with the second portions of said additional male member respective radial gaps communicating with opposite ends of said additional passage.

3. As a novel article of manufacture, a valve body particularly for use in hydraulic slide valves, comprising in combination, at least one sleeve-shaped female member having an inner circumferential wall surface; and a male member extending through said female member and including at least one first portion located within said female member rigid with said wall surface and having a smaller cross-sectional area than said female member to define with said wall passage surface two longitudinally extending open ended passages, said first portion having two surfaces on opposite sides engaging with said wall surface and two faces also on opposite sides and defining with said wall surface said passages, the entire surface of each of the faces of the first portion having less curvature than the circumferential wall surface of the female portion, and at least a pair of second portions each rigid with one end of said first portion and located outwardly adjacent to but slightly spaced from the respective axial end of said sleeve-shaped female member and defining with the same a substantially radial gap communicating with said passage.

4. An article of manufacture as defined in claim 3, wherein said first and second portions of said male member are of one-piece construction.

5. An article of manufacture as defined in claim 3, wherein said second portions of said male member are of substantially cylindrical cross-sectional configuration.

6. An article of manufacture as defined in claim 5, wherein one of said second portions has a smaller outer diameter than the other second portion.

7. An article of manufacture as defined in claim 6, wherein said sleeve-shaped female member has an inner diameter at most slightly larger than the outer diameter of said one second portion.

8. An article of manufacture as defined in claim 2, wherein said securing means is an annular member surrounding the abutting second portions of smaller diameter and rigid therewith.

9. An article of manufacture as defined in claim 2, wherein said annular member is hard-soldered soldered to the respective second portions of smaller diameter.

10. An article of manufacture as defined in claim 3, wherein said first portion is friction-fitted into said female members.

11. An article of manufacture as defined in claim 1, wherein said first portion is hard-soldered to said wall surface of said female member.

12. An article of manufacture as defined in claim 7, wherein said first portion has a minimum cross-sectional dimension considerably smaller than the outer diameter of said one second portion, and a maximum cross-sectional dimension at most equal to the outer diameter of said one second portion.